(12) United States Patent
Elliot et al.

(10) Patent No.: US 9,116,923 B2
(45) Date of Patent: Aug. 25, 2015

(54) CONSTRUCTION DRAWING EVALUATION SYSTEMS AND METHODS

(71) Applicant: Trimble Navigation Limited, Sunnyvale, CA (US)

(72) Inventors: Douglas M. Elliot, Englewood, CO (US); Mark Mandarelli, Concord (CA); John Ritzenthaler, Lafayette, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 65 days.

(21) Appl. No.: 13/647,278

(22) Filed: Oct. 8, 2012

(65) Prior Publication Data
US 2013/0091125 A1 Apr. 11, 2013

Related U.S. Application Data

(60) Provisional application No. 61/544,169, filed on Oct. 6, 2011.

(51) Int. Cl.
G06F 7/00 (2006.01)
G06F 17/30 (2006.01)

(52) U.S. Cl.
CPC .............................. G06F 17/30271 (2013.01)

(58) Field of Classification Search
USPC .......................................... 382/194; 707/722
See application file for complete search history.

(56) References Cited

U.S. PATENT DOCUMENTS

| | | | |
|---|---|---|---|
| 4,782,448 A | 11/1988 | Milstein | |
| 4,933,865 A | 6/1990 | Yamamoto et al. | |
| 5,181,822 A | 1/1993 | Allsop et al. | |
| 5,187,784 A | 2/1993 | Rowson | |
| 5,655,031 A * | 8/1997 | Yukawa et al. | 382/194 |
| 5,893,082 A | 4/1999 | McCormick | |
| 5,963,655 A * | 10/1999 | Sakurai | 382/113 |
| 5,999,647 A * | 12/1999 | Nakao et al. | 382/187 |
| 6,314,194 B1 | 11/2001 | Michael et al. | |
| 6,324,508 B1 | 11/2001 | Finney | |
| 6,550,685 B1 * | 4/2003 | Kindberg | 235/494 |
| 6,658,387 B2 | 12/2003 | Finney | |
| 6,941,000 B2 | 9/2005 | Wong | |
| 6,996,503 B2 | 2/2006 | Jung | |
| 7,587,061 B1 | 9/2009 | Pacenti | |
| 7,672,009 B2 | 3/2010 | Ciccarelli | |
| 7,720,703 B1 | 5/2010 | Broughton | |
| 8,244,608 B2 | 8/2012 | Wood | |

(Continued)

FOREIGN PATENT DOCUMENTS

CN 1282028 C 10/2006
JP 4205170 A 7/1992

(Continued)

Primary Examiner — Alex Gofman
Assistant Examiner — Muluemebet Gurmu
(74) Attorney, Agent, or Firm — Kilpatrick Townsend & Stockton LLP

(57) ABSTRACT

The invention provides the ability to count symbols within drawings in an automated fashion using a computer processor. This may be accomplished by identifying a particular symbol (representing a drawing part) and then permitting the computer to search for the identified symbol in the drawing. Following the initial search, a secondary search may be performed to increase the accuracy of an initial automated count, and obtaining refined searches results representing similar parts (represented by the same symbol) but being a part type as indicated by an identifier associated with the initial symbol.

18 Claims, 21 Drawing Sheets

GROUP 1

GROUP 2

GROUP 3

(56) References Cited

U.S. PATENT DOCUMENTS

| | | |
|---|---|---|
| 2002/0026343 A1 | 2/2002 | Duenke |
| 2004/0054568 A1 | 3/2004 | Bradley et al. |
| 2010/0023432 A1 | 1/2010 | Wood |
| 2012/0195508 A1* | 8/2012 | Noyes ............................ 382/218 |

FOREIGN PATENT DOCUMENTS

| | | |
|---|---|---|
| JP | 7175850 A | 7/1995 |
| JP | 10124554 A | 5/1998 |
| JP | 10307913 A | 11/1998 |
| JP | 2001-182321 A | 7/2001 |

* cited by examiner

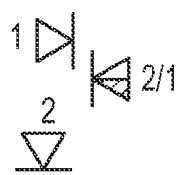 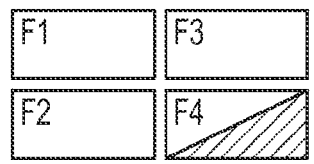 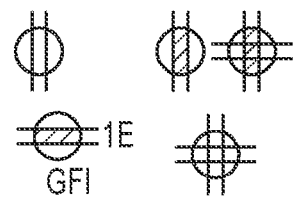
GROUP 1          GROUP 2          GROUP 3
FIG.1

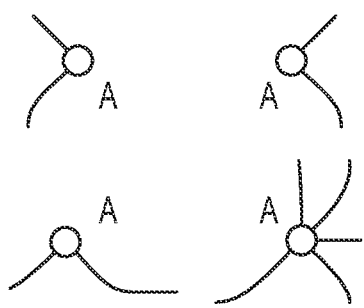
GROUP 5
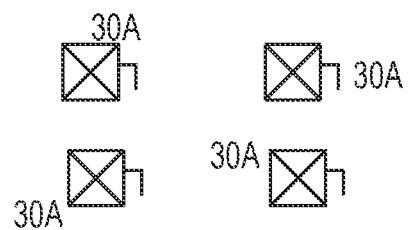
GROUP 6
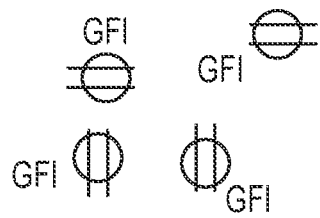
GROUP 7
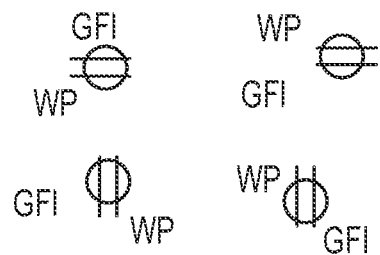
GROUP 8
FIG.19

CONSTRUCTION DRAWING EVALUATION SYSTEMS AND METHODS

CROSS-REFERENCE TO RELATED APPLICATION

This application claims the benefit of U.S. Provisional Patent Application Ser. No. 61/544,169 filed Oct. 6, 2011, which is hereby incorporated by reference.

BACKGROUND OF THE INVENTION

This invention relates to the detection and counting of objects, such as symbols in drawings.

When searching an electronic drawing for symbols, the user may initially identify a particular symbol, then have a computer program search the drawing in order to count the number of parts represented by that symbol (e.g., to determine how many items or parts of a particular type need to be included in planning costs, ordered for installation, or for other purposes). In some cases, similar symbols that were not intended to be identified may be returned as part of the initial search and are often referred to as false positives.

For example, drawings often contain symbols that look similar, but may have variations in appearance or may have associated identifiers that distinguish parts from each other. This is illustrated in FIG. 1, where three groups of graphic symbols (representing electrical parts or items) are shown. Group 1 may illustrate data/telephone outlets, Group 2 may illustrate fluorescent light fixtures and Group 3 may illustrate electrical receptacles. These, of course, are only examples, since a typical construction drawing might have hundreds (or more) of different symbols. In each group, the symbols may vary in appearance (e.g., by shading) or have different identifiers (e.g., letters or numbers) that distinguish between similar symbols (and the parts they represent). As seen in FIG. 1, the same symbol may appear in some instances with identifiers inside the symbol, in other instances with an identifier adjacent or nearby the symbol, and in yet other instances without any identifier at all. Thus, each symbol may represent a general part (e.g., a light fixture), but the particular type of part (e.g., a type of light fixture) will depend on the identifier or variations in the symbol appearance. When searching for symbols in a drawing, the inclusion of similar symbols in search results (without taking into account variations in appearance or the existence of identifiers) may lead to the identification of unwanted symbols in the results.

BRIEF SUMMARY OF THE INVENTION

The invention provides the ability to count symbols within drawings and other images in an automated fashion using a computer processor. This may be accomplished by identifying a particular symbol or combination of symbols and then permitting the computer to search for the identified symbol(s) in a drawing. Following the initial search, a secondary or refined search (also referred to as a search within the initial search) may be performed to greatly increase the accuracy of the initial automated count by eliminating false positives from the initial search. For example, false positives may be filtered in a secondary search by using a selected identifier. The refined or secondary search may focus on the pixels that make that symbol different from other similar symbols, such as the pixels in the selected identifier being located within the identifier.

In an alternative embodiment, no refined or secondary search is conducted. Rather, the search is an expanded search and involves selecting a desired symbol, its associated identifier(s) and a defined search area disposed about the symbol and the identifier(s). The results of the expanded search will identify and count all symbols that have the associated identifier(s) within the defined search area.

In yet another embodiment, an initial search is an expanded search. A desired symbol, its associated identifier(s) and a defined search area disposed about the symbol and the identifier(s), are each selected. In this particular embodiment, after results are obtained from the expanded initial search, a refined or secondary search may also be performed. The refined search may be conducted as described earlier, using a selected identifier to filter the initial search results, especially when the initial search results include the selected symbol having multiple or different identifiers located near the symbol.

In one specific embodiment, there is provided a method for counting symbols in an image, such as a drawing. The method includes providing an image in electronic form, the image having a plurality of symbols, at least some of which have identifiers associated therewith, each of the identifiers including a plurality of pixels, identifying, by a computer processor, a symbol in the image to search, and searching, by the computer processor, the image for the identified symbol and displaying initial search results for the identified symbol on a display screen. The method further includes selecting, by the computer processor, the identified symbol from the displayed initial search results, specifying, by the computer processor, pixels of an identifier associated with the selected symbol, performing, by the computer processor, a refining secondary search of the initial search results for symbols that include the specified pixels, and displaying the symbols from the secondary search that include the specified pixels.

BRIEF DESCRIPTION OF THE DRAWINGS

FIG. 1 illustrates drawing symbols that have variations in appearance or different identifiers in order to distinguish between the symbols and the parts they represent.

FIG. 7 illustrates a display screen showing the initial search results for the symbol identified in FIG. 5, including false positives.

FIG. 15 illustrates a portion of the display screen seen in FIG. 14, showing how symbols with a second specified identifier may be marked and removed from the search results.

FIG. 19 illustrates examples of drawing symbols that have identifiers located in different positions around the symbols with which they are associated.

DETAILED DESCRIPTION OF THE INVENTION

Figure 2:
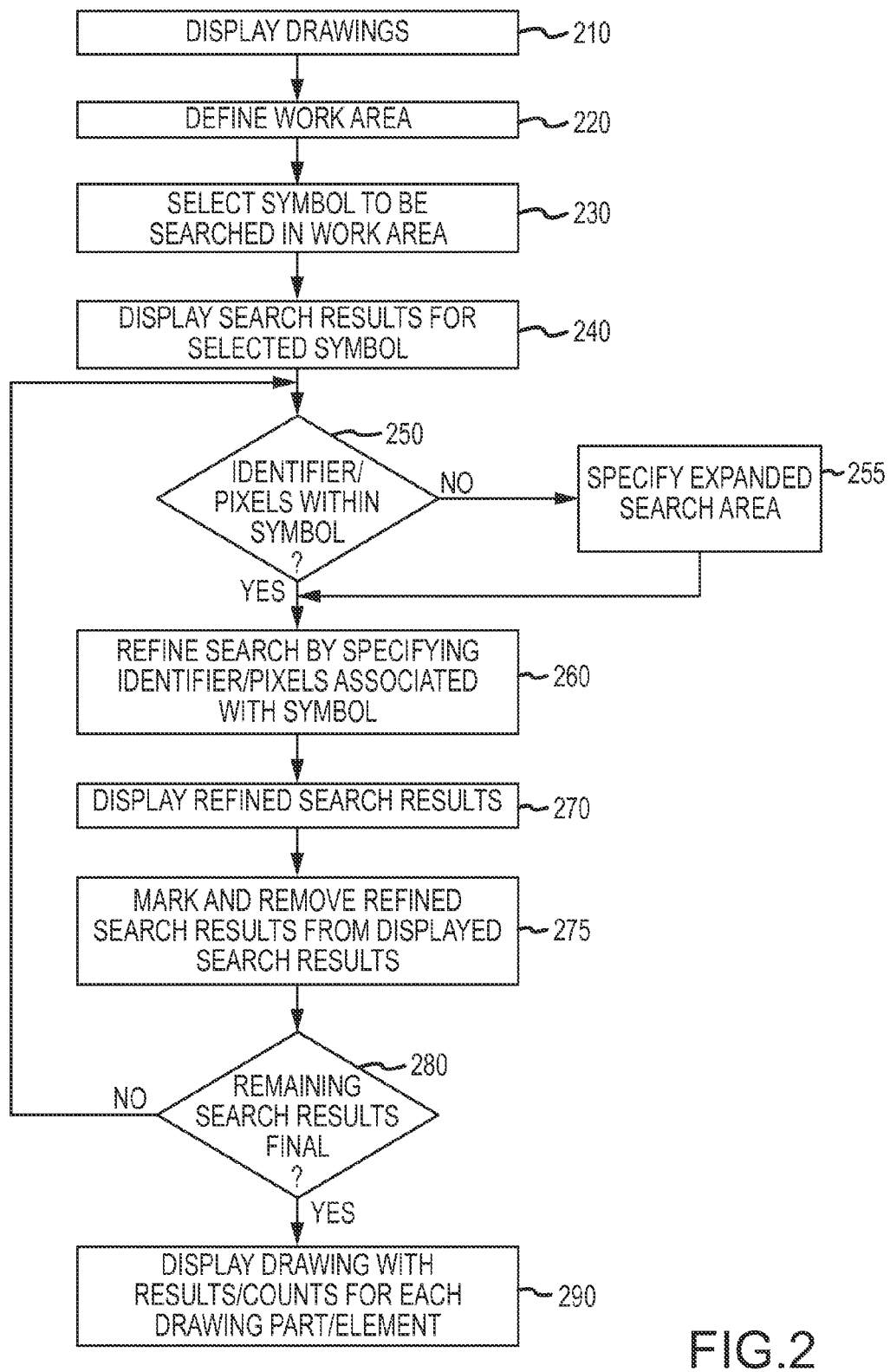
FIG. 2 is a flow diagram of a process for searching a construction drawing in accordance with one embodiment of the invention.

The invention may be used to identify symbols in drawings and other images. The drawings or images may be used in a variety of applications and industries, including drawings used in connection with mechanical, electrical, plumbing and structured cabling/intelligent transport systems. Other types of drawings using symbols may also be used.

In described embodiments, parts in a drawing are each represented by a symbol. In the case of some parts, symbols may be the same or similar but have identifiers (such as those earlier illustrated in FIG. 1) that distinguish between types of parts. Thus, as an example, and referring again to FIG. 1, the parts in Group 2 may represent fluorescent light fixtures, each part illustrated by a symbol in the form of a rectangular box. However, the identifiers within those symbols (F1-F4) each designate a different type of fluorescent light fixture or part. Further, such symbols may be slightly different in appearance to distinguish between parts, such as the part F4 in FIG. 1, which is shown partially shaded.

As described earlier, a search of symbols alone will often return false positives because of the different part types represented by the same symbol. Embodiments of the present invention count parts in a drawing by searching for symbols, but remove false positives by refining the search results based on identifiers associated with the symbols. In one embodiment, an initial search is conducted for parts that are all represented by an identified symbol, the search results are then refined by specifying an identifier associated with a particular type of part, and the results of the refined search are displayed. Refined searches may be done iteratively so that, after counting and displaying (e.g., highlighting in the drawing) the parts associated with an initial identifier, a search for parts associated with a next identifier may be conducted (counting and displaying on the drawing the parts associated with that next identifier), and repeating the refined searches until all parts represented by a symbol (and each type of part having a different identifier associated with that symbol) are counted and the results shown.

In other embodiments, no refined or secondary search is conducted. Rather, the search is an expanded search and involves selecting a desired symbol, its associated identifier(s) and a defined search area disposed about the symbol and the identifier(s). The results of the search will identify and count all symbols that have the associated identifier(s) within the defined search area. The identifier(s) may be positioned inside or outside the symbol.

In yet other embodiments, an initial search is an expanded search, and a desired symbol, its associated identifier(s) and a defined search area disposed about the symbol and the identifier(s), are each selected. In this particular embodiment, after results are obtained from the expanded initial search, a refined or secondary search may also be performed. The refined search may be conducted as described earlier, using a selected identifier to filter the initial search results, especially when the initial search results include the selected symbol having multiple or different identifiers located near the symbol. For example, the refined search may be used to filter the initial search results to identify and count symbols having different identifiers or combinations of identifiers.

While described embodiments relate to counting parts in a drawing, it should be appreciated that other embodiments of the invention are possible. In its broadest form, the present invention permits the counting objects of any nature, where the objects may be of different types represented by similar graphical forms. As just one example, an image (such as a color photographic image) of people may have the graphic form of those people (e.g., as represented by a human face in the image) counted, with types of people (e.g., those having different hair color) separately counted by iteratively providing identifiers (hair color) and refining the search results (i.e., the number of human faces) in the image according to hair color.

Turning now to FIG. 2, there is shown a flow diagram illustrating a process, in accordance with one embodiment of the invention, for searching and counting parts in a construction drawing. FIG. 2 will be described in conjunction with FIGS. 3-18 and 20-23, which illustrate various screen displays at a computer used to implement the process of FIG. 2.

Figure 3:
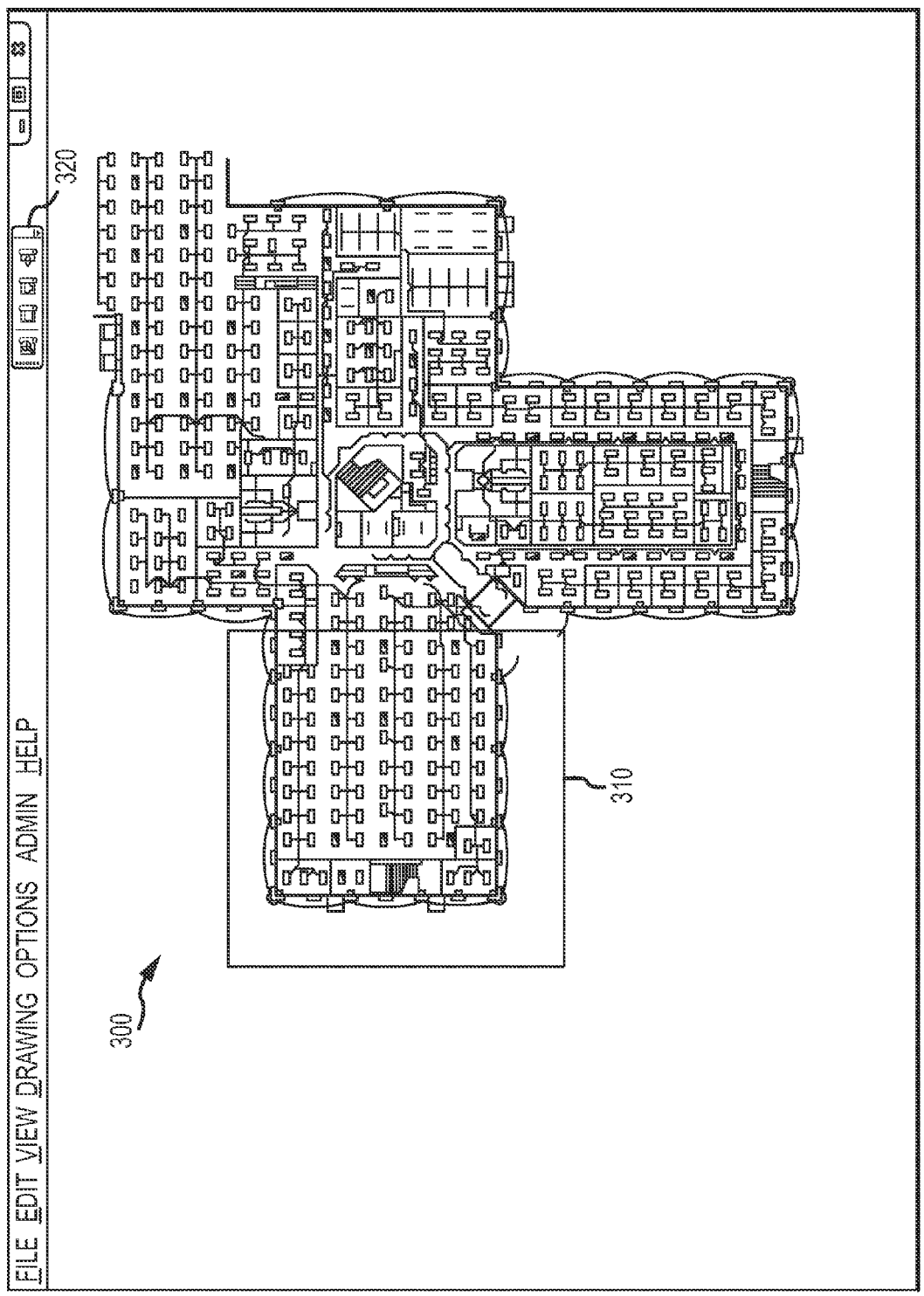
FIG. 3 illustrates a display screen showing a construction drawing with various symbols, where the drawing includes a selected work area to be searched for identified symbols.

At step 210, one or more drawings in which parts are to be counted are displayed at a computer screen. Turning briefly to FIG. 3, there is seen a screen display of a construction drawing 300 being displayed at step 210, with the particular drawing 300 illustrating lighting fixtures on one level of a commercial building. The drawing 300 on the screen display in FIG. 3 illustrates a large number of lighting fixtures and related electrical features, with each lighting fixture represented by a symbol (e.g., a rectangular box).

In one exemplary embodiment, symbols are to be identified and counted using one or more computers having a processor and appropriate software running on the computer. Additional images (i.e., drawings) may be displayed at the screen in FIG. 3 as a project progresses (and as different parts are to be counted). These images can be PDF, TIF, TIFF, CPC, CAL, PLN, JPG, JPEG, BMP or IVS format, or the like. The image is converted, in this example, to TIF format for the initial search where the symbols are counted.

At step 220 in FIG. 2, a work area to be searched is defined. This may be done with a geometrical designation, such as a rectangular or polygonal shape, although other geometries are possible. FIG. 3 illustrates one example of a polygon used to define a work area 310, in the form of a rectangular box. As part of the process, one or more work areas may be created on the drawing in FIG. 3. Each work area defines the boundaries where the counting will occur. Alternatively, the entire drawing seen in FIG. 3 could be searched as the work area, and no geometrical designation is used to define the area to be searched.

Figure 4:
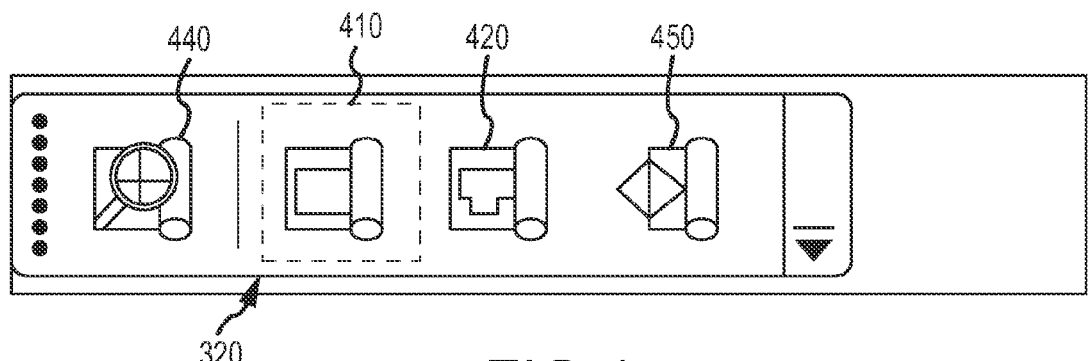
FIG. 4 illustrates an enlarged portion of the tool bar in the display screen of FIG. 1, showing the selection of a defined work area to be searched for symbols.
Figure 5:
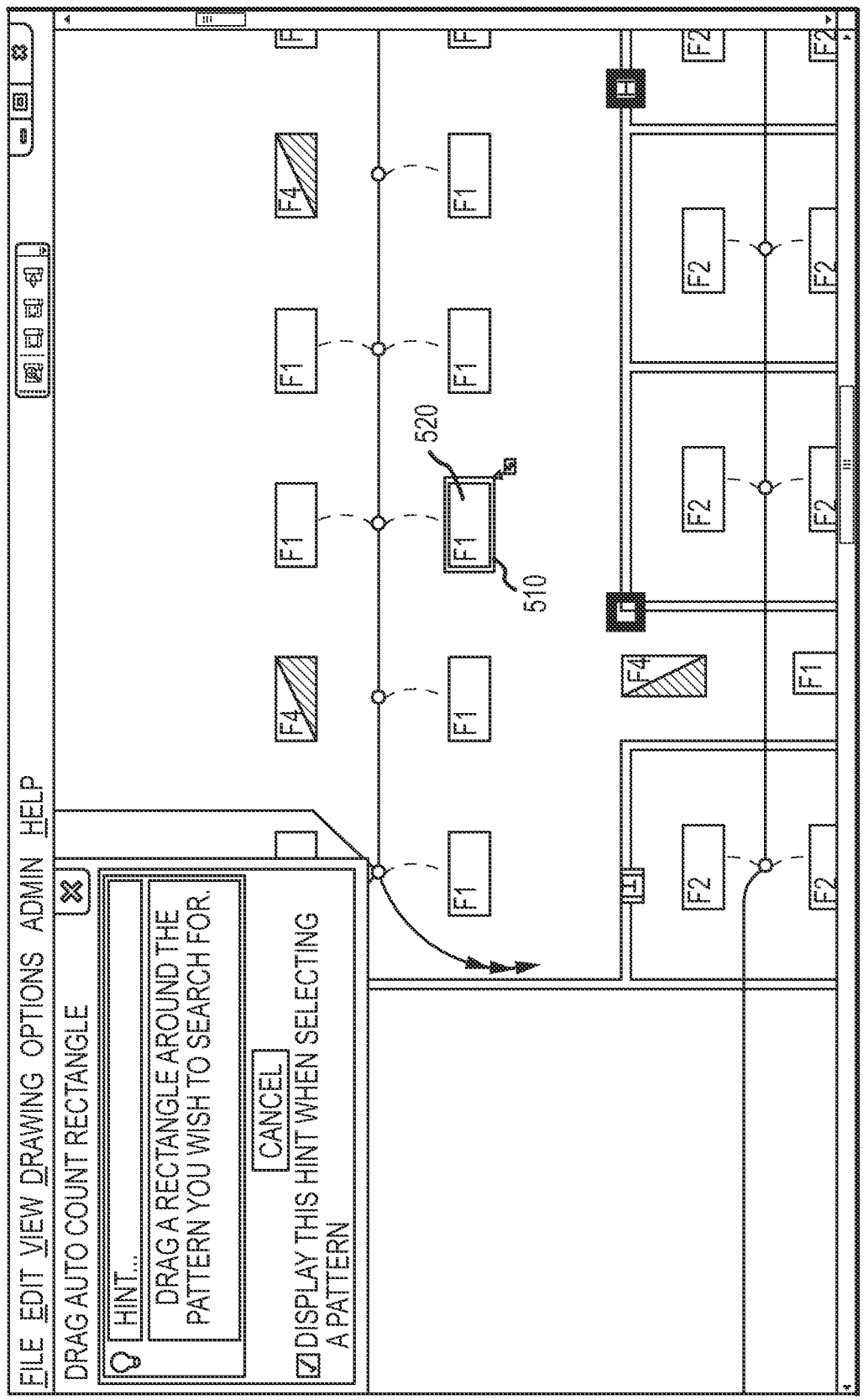
FIG. 5 illustrates a display screen showing how a symbol to be searched for in the initial search may be identified.
Figure 6:
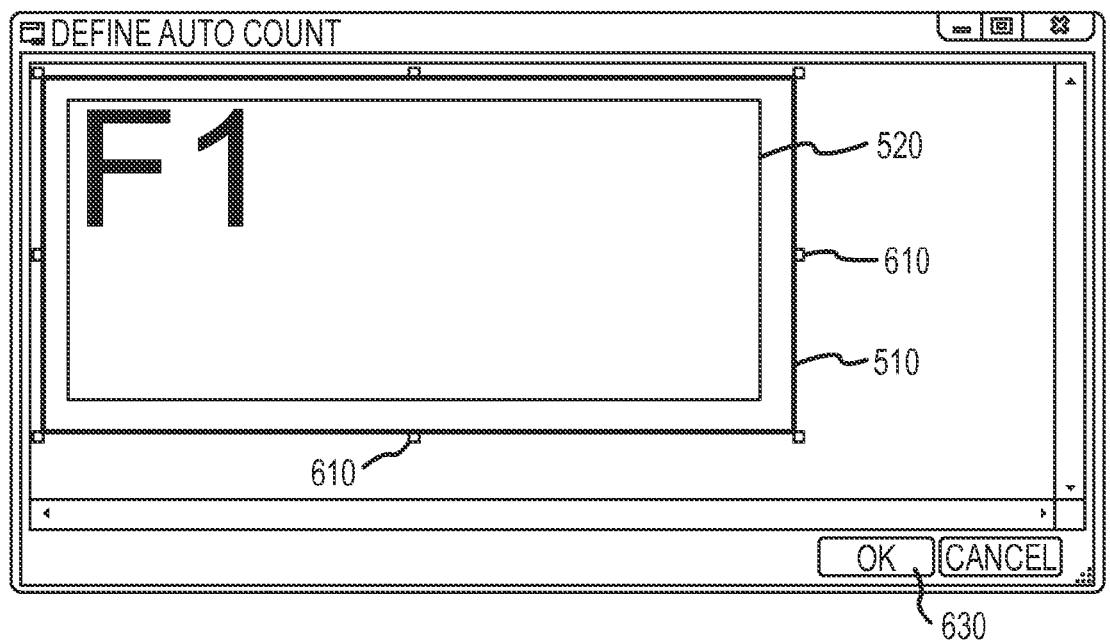
FIG. 6 illustrates a display screen showing the image of the symbol identified in FIG. 5 and how the search area for purposes of identifying a symbol may be adjusted by dragging one of the eight grips around the image.

When a work area is to be defined, various buttons at a tool bar 320 in FIG. 3 could be used. An enlarged view of the tool bar 320 is seen in FIG. 4. A button 410 has been selected to define a rectangular geometrical area within the drawing seen in FIG. 3. In such case, clicking at a location within the drawing (after selecting button 410) will result in a rectangle appearing at that location in the drawing, and the rectangle can be expanded and shaped by dragging sides or corners of the rectangle in order to place the rectangle over the area to be searched (work area 310). Alternatively, a different geometrical shape (e.g., a polygon having more than 4 sides) could be used to define the work area, by selecting a button 420 in FIG. 4, clicking at a location in the drawing to place the polygon, and thereafter changing the size and shape of the polygon by dragging sides and corners. Other geometrical shapes are also possible, such as a triangular work area defined by selecting button 450.

An automated counting process to count parts in the drawing is begun at step 230 in FIG. 2 by selecting or identifying an appropriate symbol or icon. This is illustrated at the enlarged view of the drawing 300 seen in the screen display of FIG. 5. For example, by selecting the start/continue button 440 (FIG. 4) and then clicking at location at one of the symbols in FIG. 5, a search rectangle 510 is created around a symbol 520. The search rectangle 510 may be dragged (e.g., at one of its corners or sides) to enlarge the rectangle 510 as necessary to fully enclose the symbol 520. With the symbol identified in the drawing 300, the symbol to be searched may be more finely adjusted or edited as shown at the screen display in FIG. 6, with such screen created, for example, by again selecting the start/continue button 440 (FIG. 4) at the screen seen in FIG. 5. The search rectangle 510 may be adjusted by stretching borders around the symbol 520. There are eight grips or pads 610 around the image that can be adjusted. Grabbing a corner grip adjusts two sides at a time. As should be appreciated, the search area as well as the selection of the symbol may be specified in other ways, such as by entering specific locations, co-ordinates, dimensions or symbol identifiers at a data entry field (not shown), using an input device such as a keyboard. After adjusting the search rectangle 510, a search is initiated by selecting the OK button 630 in FIG. 6.

Systems and methods for searching a drawing for a specified symbol are described in U.S. Pat. No. 8,244,608, issued Aug. 14, 2012, to Andrew Wood, U.S. Pat. No. 7,587,061, issued Sep. 8, 2009, to James Pacenti, and U.S. Patent Publication No. 2004/0054568 to Gary Bradley et al., each of which is hereby incorporated by reference.

Figure 7:
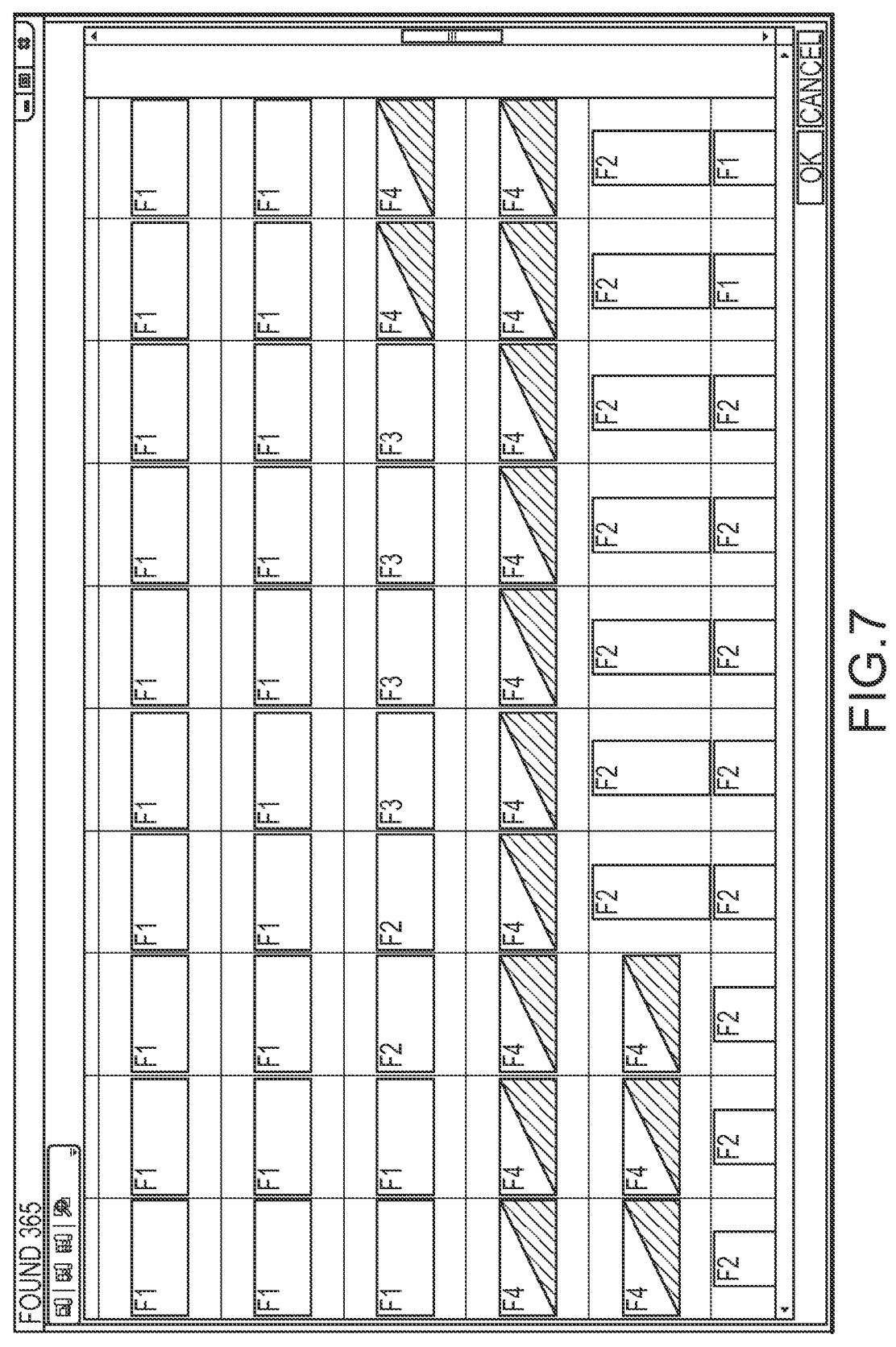

The system then displays the search results for the selected symbol (step 240, FIG. 2). FIG. 7 illustrates a screen display showing the initial search results. These may be visually inspected to determine whether the search produced any false positives. In this case, a rectangular symbol with the F1 identifier was selected. However, the search produced other rectangular symbols with F2, F3 and F4 symbols that would be considered false positives (assuming the user did not want a count of symbols with identifiers other than F1). As will be appreciated by those skilled in the art, in order to produce useful searching, software programs that search images are designed to produce results having a percentage match (similarity to the identified symbol), and the initial results that include symbols (rectangles) with F2, F3, and F4 would typically be within a standard percentage match. As indicated on the screen display in FIG. 7, 365 parts have been identified (rectangular symbols with identifiers F1, F2, F3 and F4.

The user is given the option of refining the initial search to separate the desired results from the false positives. This is done by selecting the start/continue button 440, and clicking on one of the symbols (displayed in FIG. 7) in order to provide a new search area 810 seen in the enlarged view of the screen in FIG. 8. The new search area is used to identify the correct symbol (the rectangles with F1) and to specify the identifier/pixels for the secondary search (step 260). Also, it should be appreciated that, in alternative embodiments, this step could be performed as part of the initial search so that a refined search would not be needed.

Figure 8:
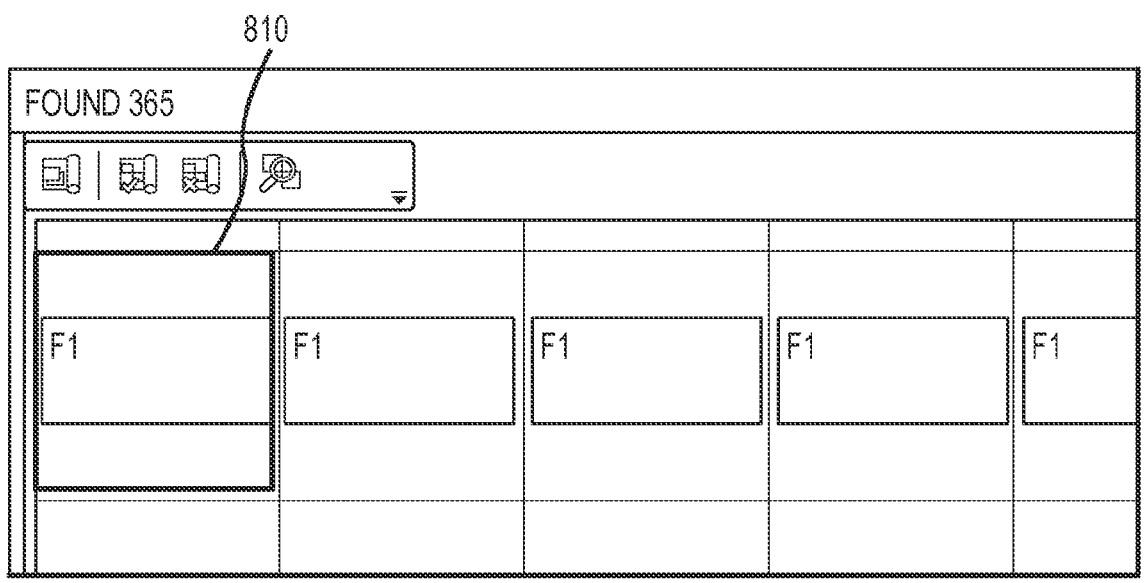
FIG. 8 illustrates a display screen showing how the initial search results may be refined by specifying an identifier associated with the symbol.

For purposes of describing the present embodiment, it is assumed (step 250, FIG. 2) that the identifier to be specified is within the selected symbol as seen in FIG. 8. An alternative embodiment, where the identifier may be located outside the symbol, will be described later in conjunction with FIGS. 19-23.

Figure 9:
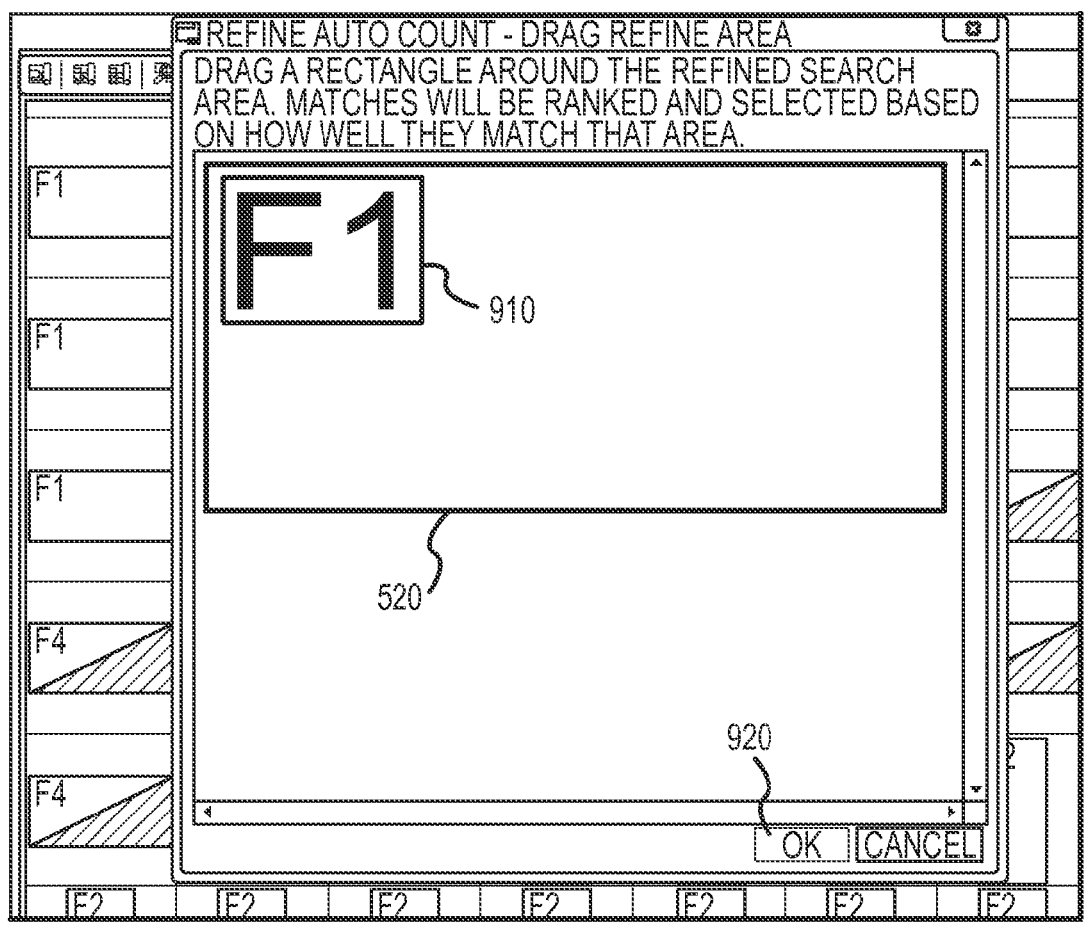
FIG. 9 illustrates a display screen showing an identifier that has been specified for a refined search.

By continuing the refining operation (selecting button 440), the search area may be more finely adjusted by presenting the screen seen in FIG. 9. As shown in FIG. 9, the pixels may be identified by clicking on the location of the identifier "F1" in order to draw or place a box 910 around identifier "F1," and specify it as the wanted identifier within the earlier identified symbol 520. Similar to the search rectangle 510 described earlier in conjunction with FIG. 6, the search area (box 910) may be reduced, enlarged or adjusted by grabbing grips or pads (not seen in FIG. 9) around the box 910.

Figure 10:
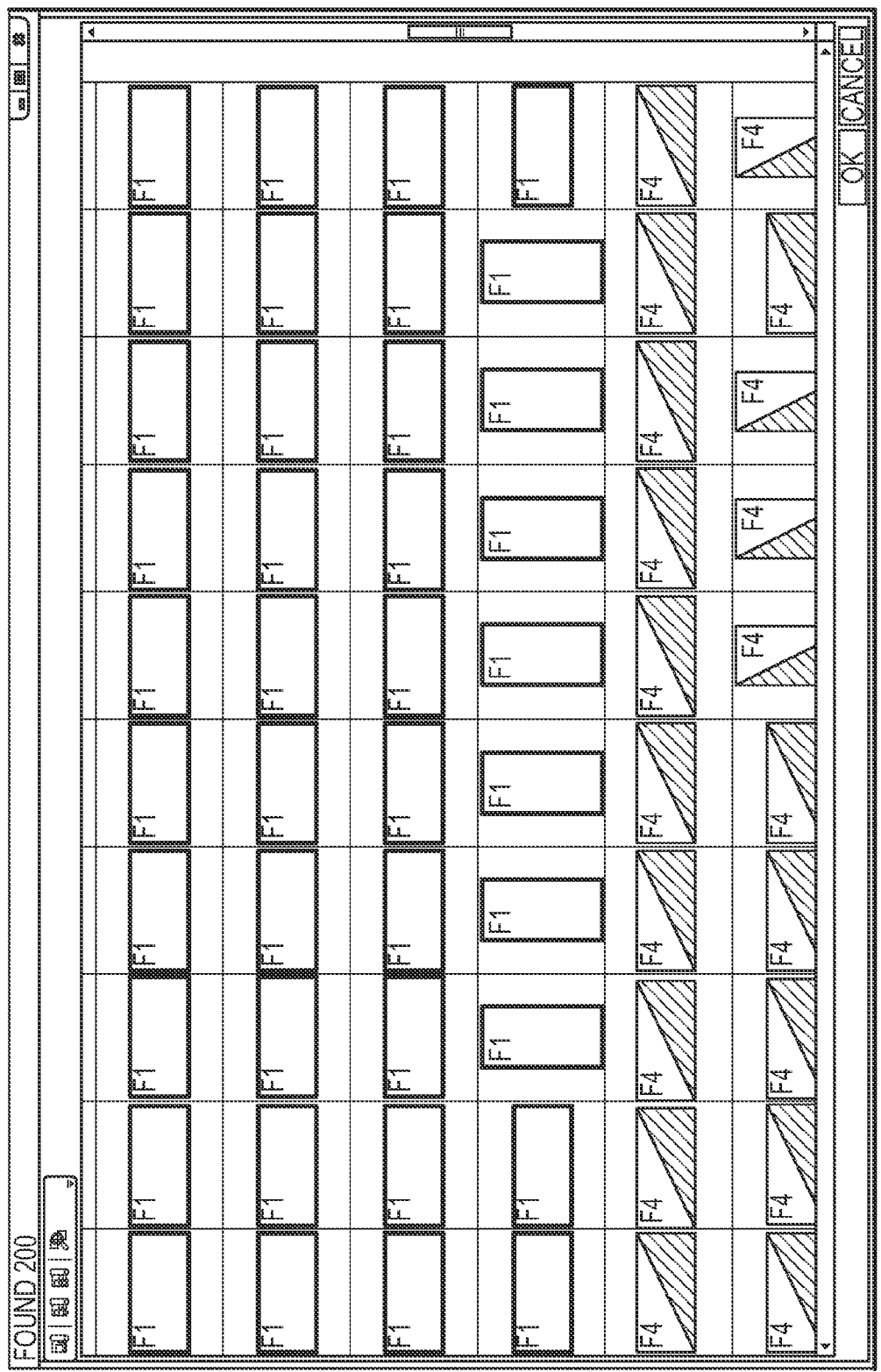
FIG. 10 illustrates a display screen showing the results of the refined search.

Alternatively, the identifier could be more or less than the pixels comprising "F1," for example, if the user wanted the identifier "1" to be specified (without the "F"), or if the user wanted other pixels near "F1" (not illustrated in FIG. 9) to be included in the refined search area. By clicking the OK button 920, the refined search results are displayed (step 270, FIG. 2). The resulting display screen is illustrated in FIG. 10, where the selected symbols are listed at the top of the screen, with the false positives below. In this case, the symbols with F1 listed at the top are also marked or highlighted (darkened outlines of the symbols). As illustrated at the top of the screen display in FIG. 10, the refined search yields a count of 200 (rectangular symbols with "F1").

Figure 11:
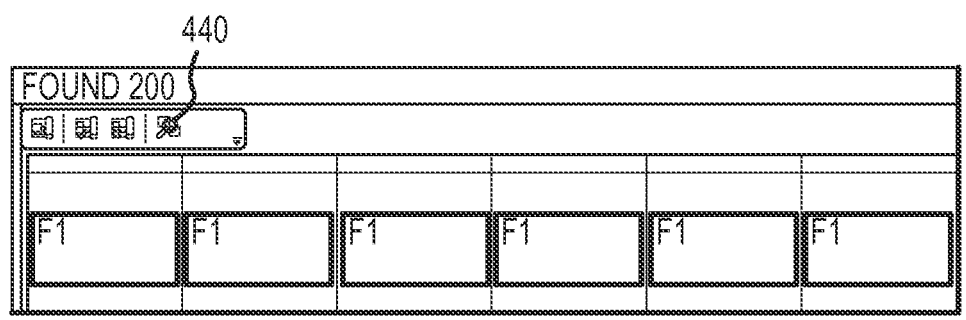
FIG. 11 illustrates a portion of the display screen seen in FIG. 10, showing how symbols with a specified identifier may be marked and removed from the search results.

FIG. 11 illustrates a portion of the screen display seen in FIG. 10. The marked results of the refined search are then removed from the initial search results at step 275 (FIG. 2), by selecting the continue button 440.

Figure 12:
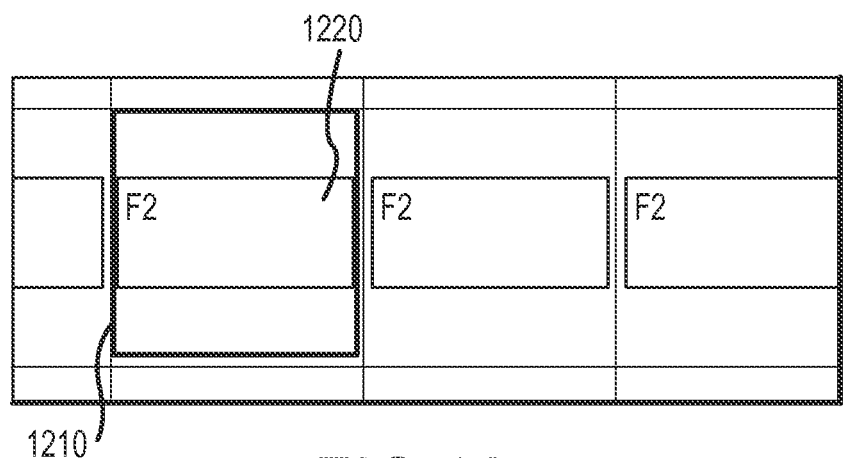
FIG. 12 illustrates a display screen showing how the refined search results may be further refined by specifying a second identifier.
Figure 13:
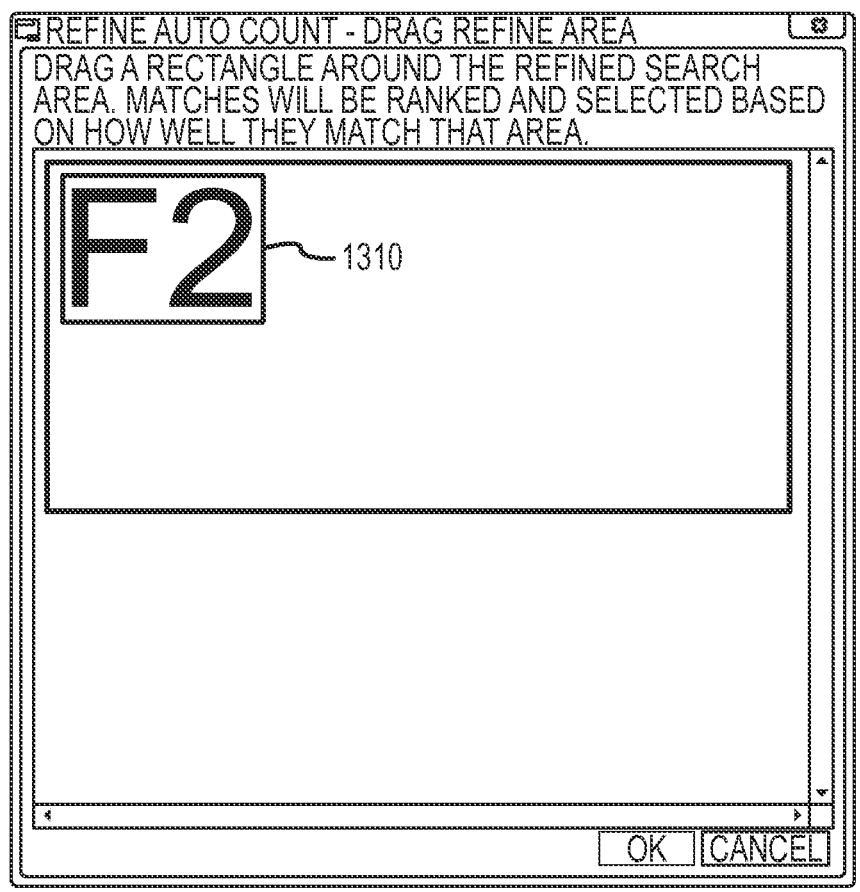
FIG. 13 illustrates a display screen showing the second identifier that has been specified for the further refined search.

At this point, unless the results for F1 are the final results desired (step 280), the refinement process continues by repeating steps 250-280 (FIG. 2) and conducting a secondary search for other symbols from the results of the initial search. In this way, the user does not need to again do the initial search. Rather, each refinement simply uses results originally obtained with the initial search results for the selected symbol (step 240). As shown in FIG. 12, the user may then refine the search for all rectangles with an F2 identifier, in a manner similar to that described earlier in conjunction with FIGS. 8 and 9 for the F1 identifier. The user may again select the start/continue button 440 (after the F1 symbols have been removed at the screen in FIG. 11) and then click at a location at one of the symbols (containing the identifier "F2") in FIG. 12 in order to provide a new search area 1210 seen in the enlarged view of the screen in FIG. 12. The new search area is used to identify the correct symbol (the rectangles with F2) and to specify the identifier/pixels for the next search. By continuing the refining operation (selecting button 440), the search area may be more finely adjusted by presenting the screen seen in FIG. 13. Similar to that described in conjunction with FIG. 9, the search area (box 1310) may be reduced, enlarged or adjusted by grabbing grips or pads (not seen in FIG. 13) around the box 1310.

Figure 14:
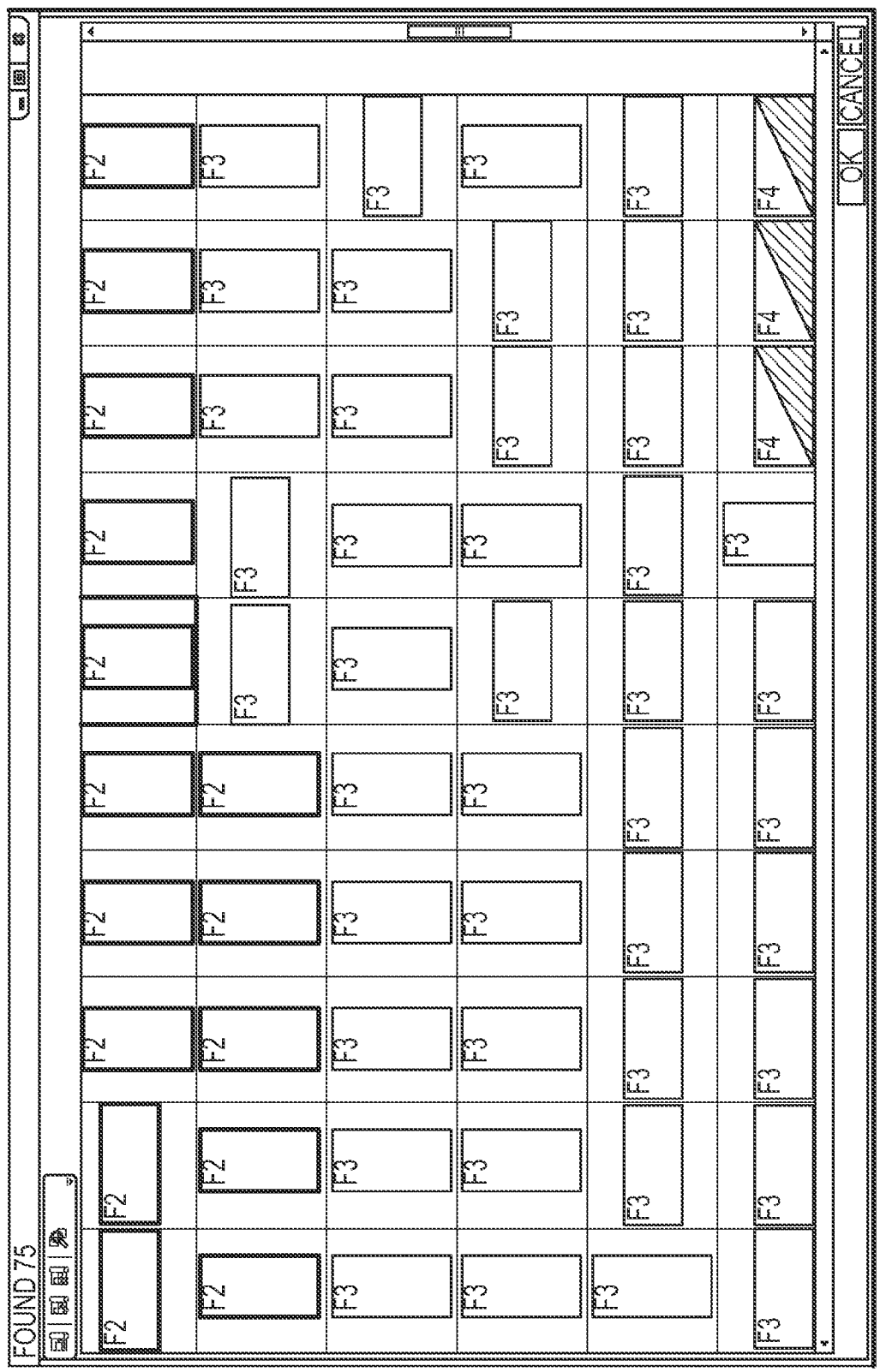
FIG. 14 illustrates a display screen showing the results of the further refined search.
Figure 15:
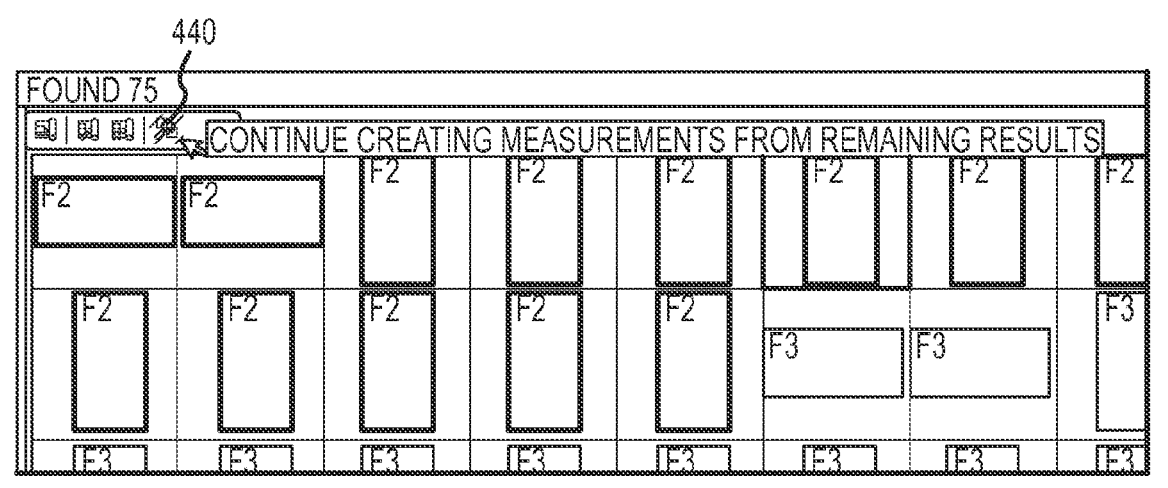

FIG. 14 illustrates a display screen with search results having all F2s placed at the top of the screen (and highlighted), with the false positives listed below. The refined search results yield a count of 75 for all symbols with the identifier "F2." As shown in FIG. 15, the continue button 440 is selected to mark the selected symbols with F2 and to remove them from the search results.

Figure 16:
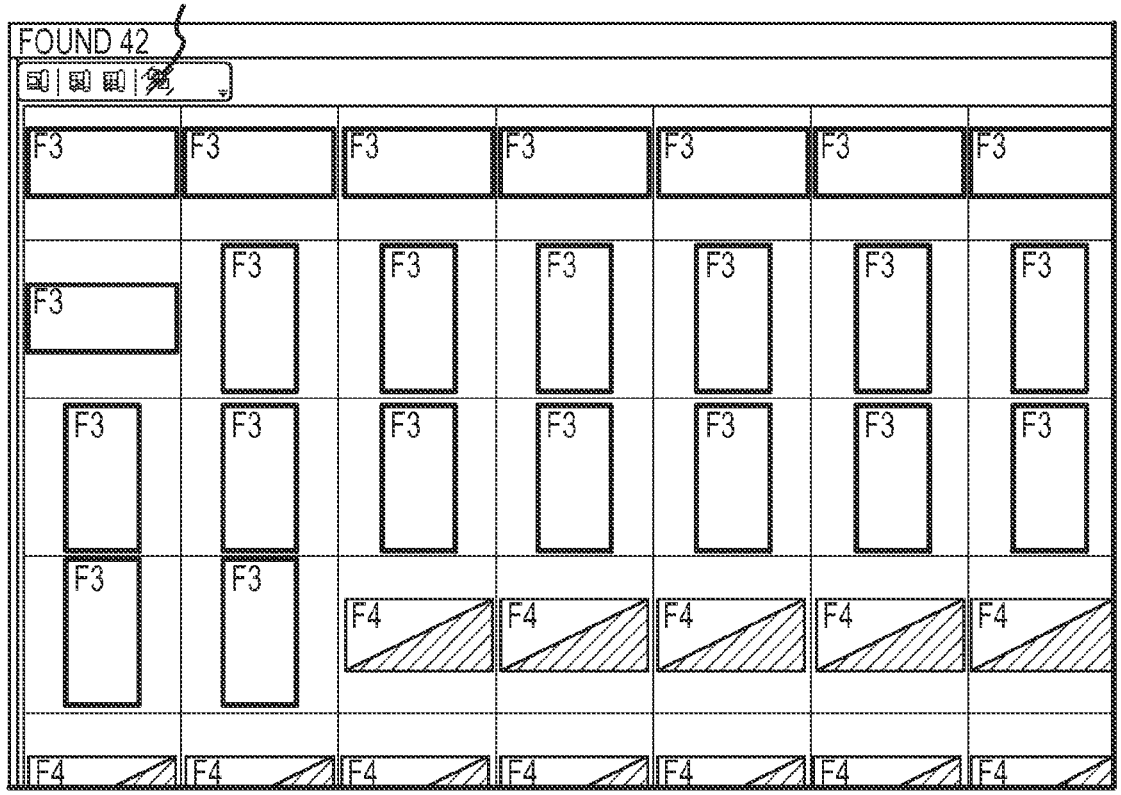
FIG. 16 illustrates a display screen showing the results of yet a further refined search.
Figure 17:
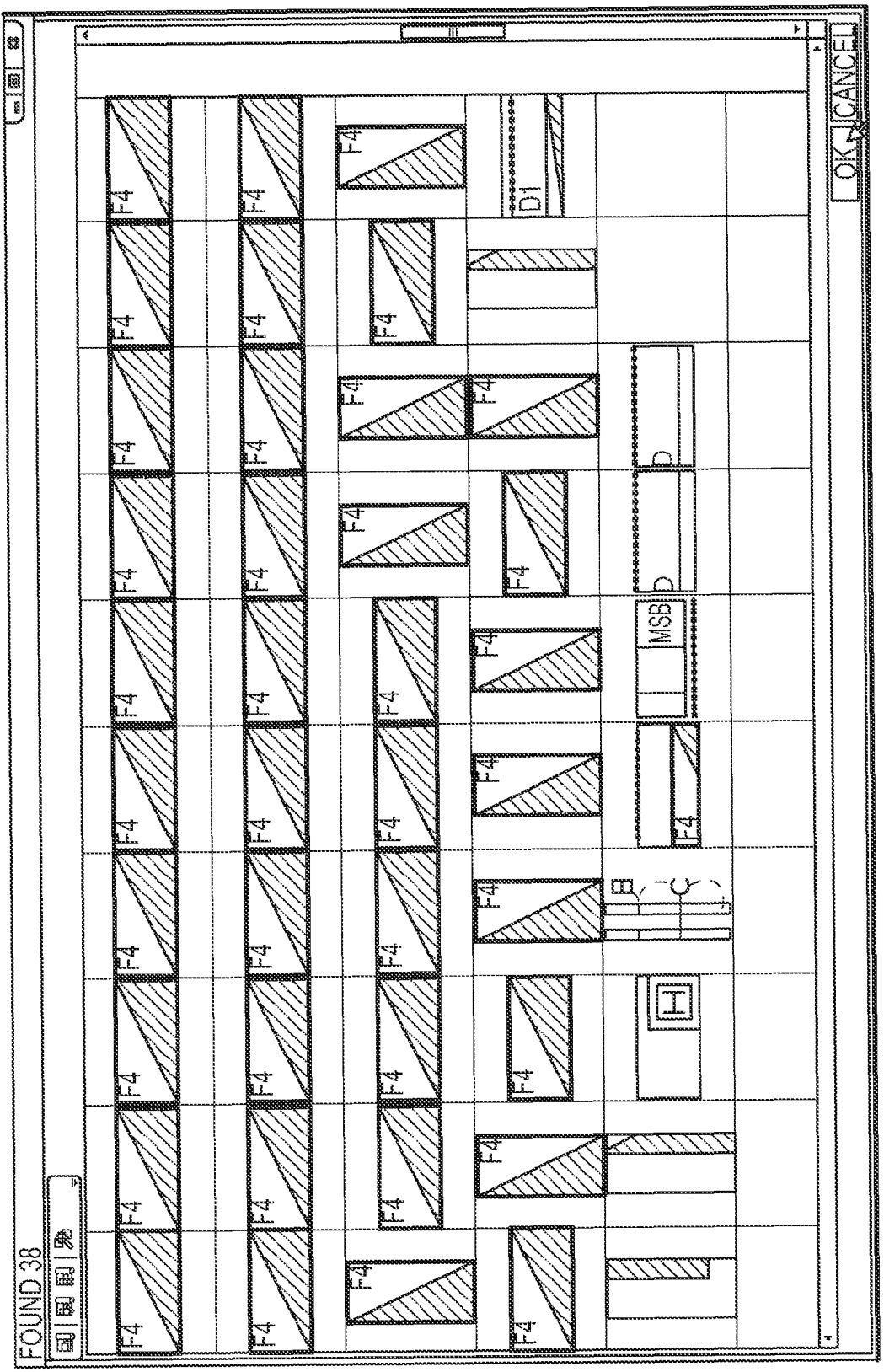
FIG. 17 illustrates a display screen showing the results of yet another refined search.

FIG. 16 illustrates the resulting refined search with rectangular symbols having an "F3" identifier highlighted and counted (using steps 260-275). By selecting the continue button 440, those symbols are removed. FIG. 17 illustrates a display screen where the next refined search results are displayed (rectangular symbols with "F4" are displayed and highlighted). This screen also illustrates the count for these symbols ("Found 38"). As will be evident, the process described above may continue until all desired symbols have been filtered and counted, and the remaining search results are final at step 280.

Figure 18:
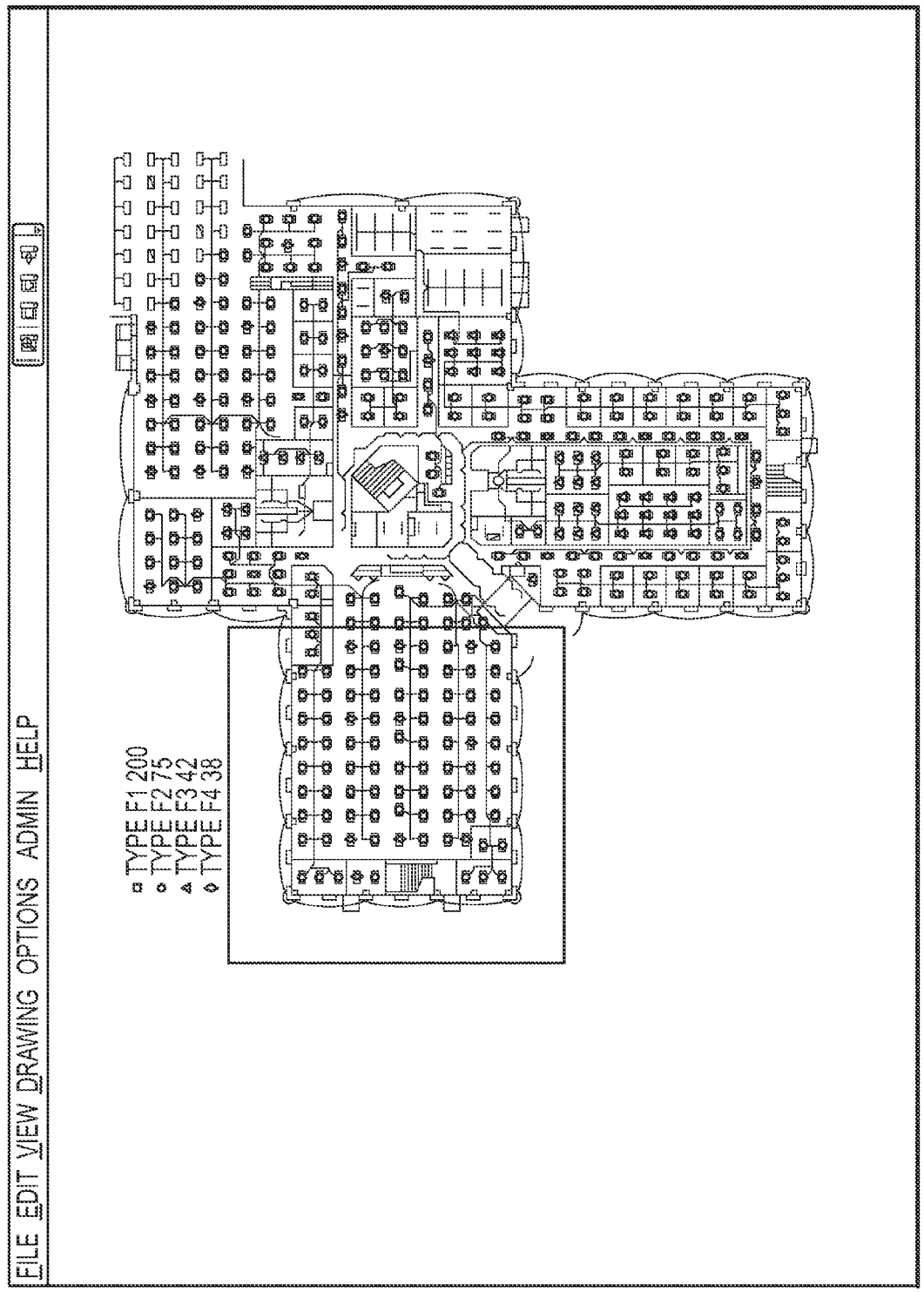
FIG. 18 illustrates a display screen showing the combined results of the initial and refined searches, including the counted number of symbols with specified identifiers.

FIG. 18 illustrates a screen display that may be produced when all symbols from the initial search have been identified and counted (using refined search results), and the drawing now has results/counts for each part, step 290 (FIG. 2). In this case, all rectangular symbols of approximately the same size have been identified and filtered by their identifier (F1, F2, F3 and F4). Further, a count of each of these symbols may be displayed as illustrated for each part type (F1, F2, F3 and F4) in FIG. 18.

In further embodiments, the invention provides alternative ways to refine an initial search (or to enhance the results of an initial search). Such an embodiment is particularly useful in cases where identifier(s) that are associated with a particular symbol are located in different locations in relation to the symbol throughout the drawing. Various non-limiting examples of such instances are illustrated in FIG. 19 as Groups 5-8. In Group 5, the single identifier of "A" is located in different spots in relation to the symbol. If an initial search, or a refined search of the initial search, is performed for the symbol and the identifier "A" in Group 5, and if the identifier "A" is defined in association with a fixed position relative to the symbol, the search will not be able to find all of the symbols with an "A" identifier. This is because the identifier "A" is in different locations relative to the symbol throughout the drawing. Similar issues arise in connection with the symbols in Group 6, 7 and 8, where an identifier or multiple identifiers are located in different positions relative to the various illustrated symbols.

As such, in an alternate embodiment an expanded search permits the user to specify: 1) the symbol, 2) the identifier(s) and 3) a distance (which could be a radius or geometrically defined search area) in which to search for the identifier. Examples of expanded searches will be described shortly in conjunction with FIGS. 20-23. One variation of this alternative operates similar to the refine process previously described, in that the original search for the symbol may return many results and the secondary search (or successive subsequent searches) for the identifier(s), within a certain distance, will narrow the results (a "search within a search," similar to previously described previously in connection with FIGS. 2-18). This embodiment is initiated at steps 250 and 255 of FIG. 2, such that if, in viewing the drawing, a desired identifier is not within a selected symbol (step 250), the user may specify an expanded search, involving a search area extending outside the symbol in which to search for the specified identifier (step 255).

In another alternative embodiment, an expanded search may produce the only search results, and there is no refined or secondary search. In this particular alternative, the expanded search is substituted for the symbol search seen at steps 230 and 240 in FIG. 2, and with no refined or secondary searches, the process may proceed to step 290 (intervening steps 250 through 280 seen in FIG. 2 would be omitted).

In yet another alternative embodiment, the process may include both an expanded search (as the initial search) and then refined or secondary searches. Thus, the expanded search would be substituted for the symbol search seen at step 230 in FIG. 2, the display of the expanded search results (each occurrence of the selected symbol having initial identifiers within a distance of the selected symbol as defined by the search area) would be substituted for the display seen at step 240 in FIG. 2, and the expanded search results would be refined in the same manner as seen at steps 250 through 280 seen in FIG. 2 (by specifying a refining search identifier associated with the symbol).

One method for an expanded search by defining a distance or search area about the symbol to be searched will be described with reference to FIGS. 20 and 21. In so doing, it will be appreciated that, as just described, such a search may be performed as an initial search, or as a secondary or refined search once an initial search has been performed. In the latter case, many of the same processes previously described in connection with FIGS. 2-18 may be performed. For example, images (i.e., drawings) may be added to the project. These images may be in various formats, such as PDF, TIF, TIFF, CPC, CAL, PLN, JPG, JPEG, BMP or IVS format, or the like. The image may be converted to TIF format. A work area to search may be defined (step 220 in FIG. 2, and similar to the work area 310 seen in FIG. 3). This may be a geometrical designation, such as rectangular or polygonal, as well as other possible geometries. As should be appreciated, this work area is different (and typically significantly larger) than the distance or search area that is to be defined when doing an expanded search as described hereinafter. The initial work area (such as work area 310) defines the boundaries of the drawing where the initial searching and counting (for symbols) will occur, whereas the search area (a radius or geometrically defined area around a symbol) defines boundaries in which to search for identifiers in relation to the symbol.

In this alternative embodiment, as in the earlier describe embodiment, the automated counting process begins by identifying the desired symbol and having the computer program search for the identified symbol. The display screen may display the initial search results and these may be visually inspected to determine whether the search produced any false positives. The user may be given the option of refining the initial search with an expanded search to remove the false positives. This is done by defining the symbol to be searched, the associated identifier(s), and a distance or area relative to the symbol. This may be facilitated by showing the initial search results on a display screen. For ease of identification, a line, border, marker or other shape may be placed about the symbol, the identifier and/or search area. The line that defines the periphery or border may be fashioned in a wide variety of ways. For example, the line could be a circle that defines a radius about the symbol or identifier, a polygon, an oval or even an amorphous or irregular shape. Further, the periphery may also be manipulated or adjusted after initial placement, such as by using a pointing device. Further, the peripheral lines of the shapes used (around the symbol, identifier and search area) may be color coded to distinguish the shapes from each other.

Figure 20:
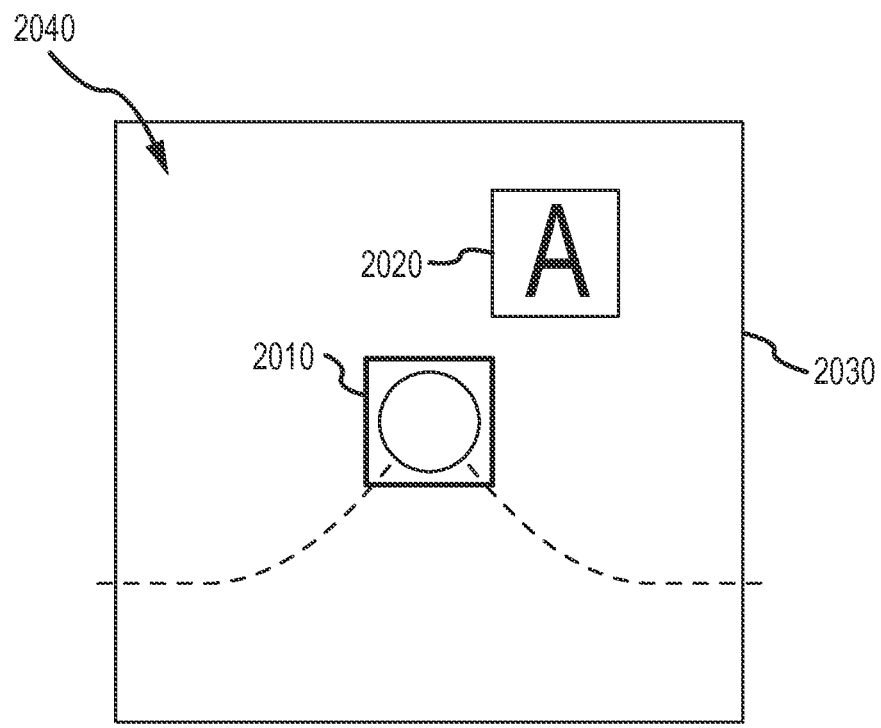
FIG. 20 illustrates a portion of a display screen showing a symbol, identifier and identifier search perimeter defined prior to performing a refined search.

For example, as shown in FIG. 20, a polygon (rectangular box 2010) is placed around a circular symbol to be searched (this may be one of the symbols seen in Group 5 of FIG. 19). This polygon may be color coded to distinguish it from other polygons or peripheral lines used when identifying the identifiers or search area. For example the polygon placed around the symbol may have a first color and the polygon (rectangular box 2020) around the first identifier "A" to be searched may have a second color. A third colored polygon (rectangular box 2030) may be placed about the area that is to be searched, defining the boundaries of a search area 2040.

The borders around the symbol, search area and/or the identifier may optionally be stretched or altered to customize the shape and/or size. Conveniently, grips around the polygon (not shown in FIG. 20) may be provided in order to manipulate the size or shape of the polygon. The corner grips may be used to affect two sides at a time. In this way, dragging a square may be performed to form a rectangle, or a circle may be dragged to change its radius.

As an alternative to placing a polygon around the search area, the search area may be specified in other ways, such as by entering specific locations, co-ordinates, dimensions and/or an area into an input device, such as a keyboard.

Once the symbol, identifier and search area have been identified, the computer processor takes each symbol identified in the initial search and searches within the defined search area 2040 for the identifier (as opposed to searching only for an identifier that is at a fixed positioned relative to the symbol). In this way, regardless of where the identifier is positioned relative to its symbol, as long as the identifier is within the defined search area, the symbol will be counted and included within the results of the refined or secondary search.

Figure 21:
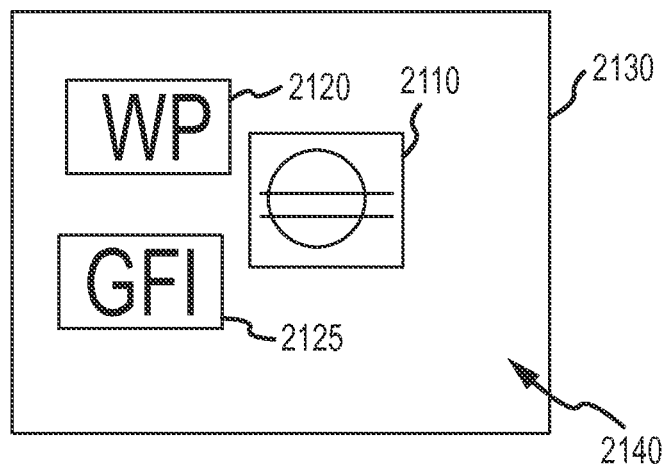
FIG. 21 illustrates a portion of a display screen showing a symbol, two identifiers and identifier search perimeter defined prior to performing a refined search.

A similar search methodology is illustrated in FIG. 21. In this example, multiple search identifiers may be included in the search, such as with the dual identifiers seen in Group 8 of FIG. 19. In the example of FIG. 21, polygons (rectangular boxes 2120 and 2125) are placed about the "WP" identifier and the "GFI" identifier. These polygons may each have their own color. As with the example of FIG. 20, a polygon (rectangular box 2110) is also placed around the symbol and a polygon (rectangular box 2130) is placed to define the search area 2140. In this way, the defined search area 2140 around each symbol from the initial search results will be searched for both the "WP" identifier and the "GFI" identifier.

A screen display similar to that shown in FIG. 10 may be produced showing the results of the expanded search. These search results may be reviewed and other refined searches may be performed using a process similar to that described above, if needed. For example, an initial search may return, depending on the percentage match built into the system, results that include the symbol (identified within box 2110) without an identifier, the symbol having one of the identifiers "WP" and "GFI" within the defined search area 2040, and the symbol with both identifiers "WP" and "GFI" within the defined search area 2040. The process for additional refined searches, similar to that described in connection with FIGS. 10-17, may be used to identify and count the number of different part types, such as parts having no identifier, parts with one nearby identifier, and parts with two nearby identifiers. Also, the percentage match can be adjusted to narrow or widen the initial search results.

Figure 22:
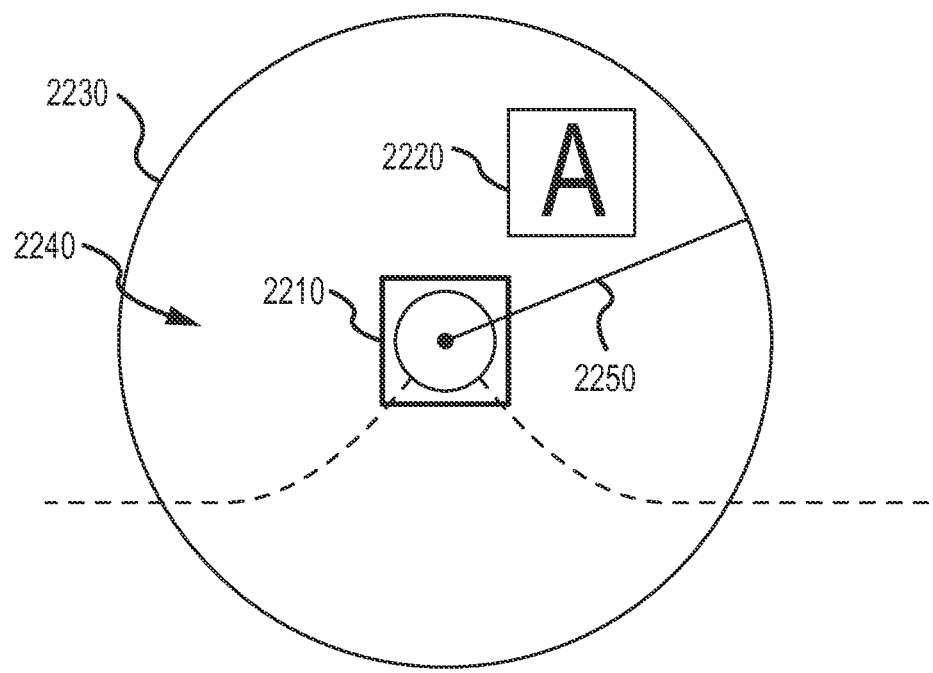
FIG. 22 illustrates an alternative embodiment, with a portion of a display screen showing a symbol and identifier (similar to those in FIG. 20) and showing an identifier search radius defined prior to performing a refined search.
Figure 23:
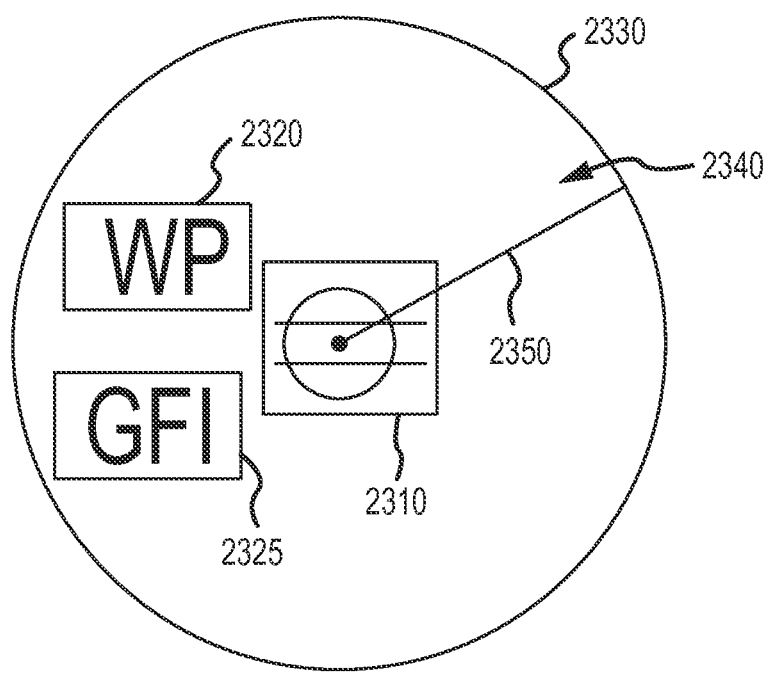
FIG. 23 illustrates an alternative embodiment, with a portion of a display screen showing a symbol and two identifiers (similar to those in FIG. 21) and showing an identifier search radius defined prior to performing a refined search.

FIGS. 22 and 23 illustrate further screen displays showing how an expanded search similar to that described in connection with FIGS. 20 and 21 may be performed. In FIG. 22, a polygon (rectangular box 2210) of a first color is placed about the symbol (a circular symbol) to be searched. A polygon (rectangular box 2220) of a second color is placed about the identifier "A" to be searched. Further, a circle 2230 of a third color is placed about both the symbol and the identifier and defines a circular search area 2240, having a radius 2250, to be used in searching for the symbol and the identifier. The radius 2250 may be changed (such as by dragging the periphery of the circle 2230) to shrink or expand the search area 2240.

As shown in FIG. 23, polygons (rectangular boxes 2310, 2320 and 2325) are placed about a circular symbol and two identifiers "WP" and "GFI". A circle 2330 defines a circular search area 2340 having a radius 2350. In this embodiment, the search will return the identified symbols that include both identifiers WP and GFI within the search area 2340.

Figure 24:
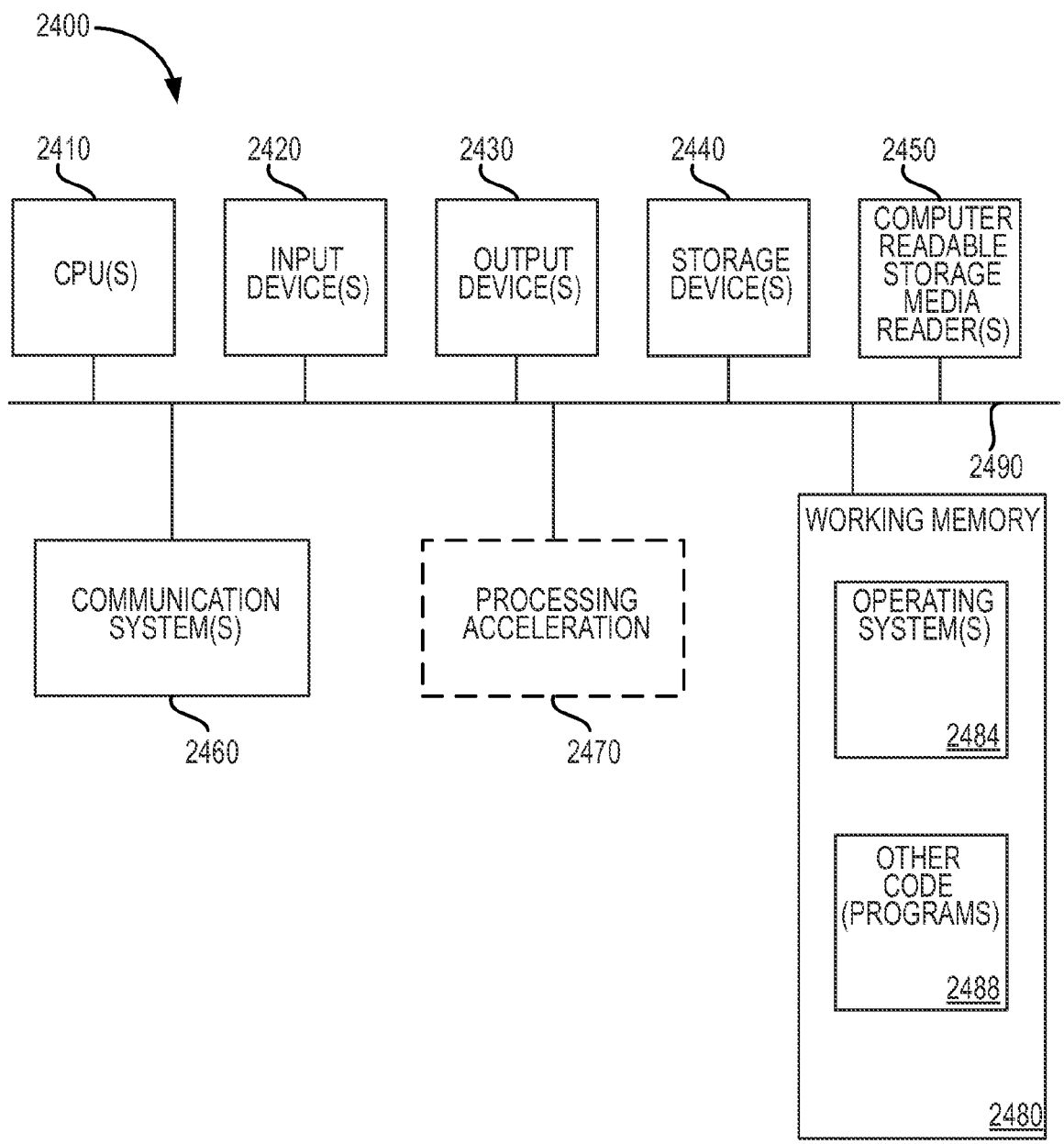
FIG. 24 is a block diagram illustrating an exemplary computer system upon which embodiments of the present invention may be implemented.

FIG. 24 is a block diagram illustrating an exemplary computer system upon which embodiments of the present invention may be implemented. This example illustrates a computer system 2400 such as may be used, in whole, in part, or with various modifications, to provide the functions of systems implemented the processes herein, such as the process illustrated in FIG. 2.

The computer system 2400 is shown comprising hardware elements that may be electrically coupled via a bus 2490. The hardware elements may include one or more central processing units 2410, one or more input devices 2420 (e.g., a mouse, a keyboard, etc.), and one or more output devices 2430 (e.g., a display device, a printer, etc.). The computer system 2400 may also include one or more storage devices 2440, representing remote, local, fixed, and/or removable storage devices and storage media for temporarily and/or more permanently containing computer-readable information, and one or more storage media reader(s) 2450 for accessing the storage device(s) 2440. By way of example, storage device(s) 2440 may be disk drives, optical storage devices, solid-state storage device such as a random access memory ("RAM") and/or a read-only memory ("ROM"), which can be programmable, flash-updateable or the like.

The computer system 2400 may additionally include a communications system 2460 (e.g., a modem, a network card—wireless or wired, an infra-red communication device, a Bluetooth™ device, a near field communications (NFC) device, a cellular communication device, etc.). The communications system 2460 may permit data to be exchanged with a network, system, computer, mobile device and/or other component as described earlier. The system 2400 also includes working memory 2480, which may include RAM and ROM devices as described above. In some embodiments, the computer system 2400 may also include a processing acceleration unit 2470, which can include a digital signal processor, a special-purpose processor and/or the like.

The computer system 2400 may also comprise software elements, shown as being located within working memory 2480, including an operating system 2484 and/or other code 2488. Software code 2488 may be used for implementing functions of various elements of the architecture as described herein. For example, software stored on and/or executed by a computer system, such as system 2400, can be used in implementing the processes seen in FIG. 2.

It should be appreciated that alternative embodiments of a computer system 2400 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention Moreover, while the various flows and processes described herein (e.g., those illustrated in FIG. 2) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computerized method for counting symbols that represent parts in an image, the method comprising:
    providing an image in electronic form, the image having a plurality of symbols, wherein the same symbol may represent a plurality of different types of parts, with at least some of the symbols having separate distinguishing identifiers associated therewith, each of the identifiers including a plurality of pixels, with the same symbol representing a particular type of part based on its associated identifier;
    identifying, by a computer processor, a symbol in the image to search;
    searching, by the computer processor, the image for the identified symbol and displaying initial search results for the identified symbol on a display screen;
    selecting, by the computer processor, the identified symbol from the displayed initial search results;
    specifying, by the computer processor, pixels of a selected first identifier associated with the selected symbol, with symbols having the first identifier representing a different type of part than symbols not having the first identifier;
    performing, by the computer processor, a separate refining secondary search of the initial search results for symbols having the specified pixels of the first identifier;
    displaying the symbols from the secondary search, including symbols that have the specified pixels of the first identifier, with the symbols having the first identifier highlighted in order to be distinguished from the symbols not having the first identifier;
    after displaying the symbols from the secondary search, removing, by the computer processor, the highlighted symbols from the displayed initial search results, so that the remaining displayed initial search results no longer display symbols that include the specified pixels of the first identifier;
    specifying, by the computer processor, pixels of a selected second identifier associated with the selected symbol;
    performing, by the computer processor, an additional secondary search of the initial search results for symbols that include the specified pixels of the second identifier; and
    displaying the symbols from the additional secondary search that include the specified pixels of the second identifier, including highlighting, in the display of the remaining initial search results, the symbols that include the specified pixels of the second identifier.

2. The method of claim 1, wherein the image comprises a construction drawing illustrating construction parts.

3. The method of claim 2, further comprising displaying the drawing, wherein the step of identifying a symbol to search comprises placing a graphic element at the identified symbol on the displayed drawing.

4. The method of claim 3, wherein the graphic element is a polygon surrounding the identified symbol.

5. The method of claim 3, wherein the graphic element is a rectangle.

6. The method of claim 3, where the graphic element is a circle.

7. The method of claim 1, wherein the selected identifier associated with the selected symbol is located within the selected symbol, and wherein the step of specifying pixels of an identifier comprises:
    placing a graphic element at the selected symbol, with the graphic element surrounding the selected symbol.

8. The method of claim 1, wherein the selected identifier associated with the selected symbol is located outside the selected symbol, and wherein the step of specifying pixels of a selected identifier comprises:
    placing a graphic element at the selected symbol, with the graphic element surrounding an area on the image that includes both the selected symbol and the identifier.

9. The method of claim 1, wherein the step of displaying the symbols from the additional secondary search comprises highlighting, in the display of the remaining initial search results, the symbols that include the specified pixels of the second identifier, and wherein the method further comprises:
    after displaying the symbols from the additional secondary search, removing, by the computer processor, the highlighted symbols from remaining displayed initial search results, so that the remaining displayed initial search results no longer display symbols that include the specified pixels of the second identifier.

10. The method of claim 9, further comprising:
    displaying, on the image, a count of the number of symbols that include the specified pixels of the first identifier and the number of symbols that include the specified pixels of the second identifier.

11. A system for counting symbols that represent items in an image, comprising a memory and a processor, the memory storing instructions that, when executed by the processor, configure the system to:
    provide an image in electronic form, the image having a plurality of symbols, at least some of which have separate distinguishing identifiers associated therewith, each of the identifiers including a plurality of pixels, wherein the same symbol may represent a plurality of different types of items, with the symbol representing a particular type of item based on its associated identifier;

identify a symbol in the image to search;

search the image for the identified symbol and displaying initial search results on a display screen;

select the identified symbol from the displayed initial search results;

specify pixels of a selected first identifier associated with the selected symbol, with symbols having the first identifier representing a different type of item than symbols not having the selected identifier;

perform a separate refining secondary search of the initial search results for symbols that have the specified pixels of the first identifier;

display the symbols from the secondary search, including symbols that have the specified pixels of the first identifier, with the symbols having the first identifier separated from the symbols not having the first identifier;

after displaying the symbols from the secondary search, removing, by the computer processor, the symbols from the displayed initial search results symbols that include the specified pixels of the first identifier, so that the remaining displayed initial search results no longer display symbols that include the specified pixels of the first identifier;

specify pixels of a selected second identifier associated with the selected symbol;

perform an additional secondary search of the initial search results for symbols that include the specified pixels of the second identifier;

display the symbols from the additional secondary search that include the specified pixels of the second identifier, with symbols having the second identifier separated from the symbols not having the second identifier; and after displaying the symbols from the additional secondary search, removing, by the computer processor, the symbols having the second identifier from the remaining displayed initial search results, so that the remaining displayed initial search results no longer display symbols that include the specified pixels of the second identifier.

12. The system of claim 11, wherein the image comprises a construction drawing illustrating construction parts.

13. The system of claim 12, wherein the system is further configured to display the drawing and to identify a symbol to search by placing a graphic element at the identified symbol on the displayed drawing.

14. The method of claim 13, wherein the graphic element is a polygon surrounding the identified symbol.

15. The system of claim 13, wherein the graphic element is a rectangle.

16. The system of claim 13, where the graphic element is a circle.

17. The system of claim 11, wherein the selected identifier associated with the selected symbol is located within the selected symbol, and wherein the system is further configured to specify pixels of an identifier by placing a graphic element at the selected symbol, with the graphic element surrounding the selected symbol.

18. The system of claim 11, wherein the selected identifier associated with the selected symbol is located outside the selected symbol, and wherein the system is further configured to specify pixels of an identifier by placing a graphic element at the selected symbol, with the graphic element surrounding an area on the image that includes both the selected symbol and the identifier.

* * * * *